United States Patent
Kozawa et al.

(10) Patent No.: US 11,988,653 B2
(45) Date of Patent: May 21, 2024

(54) CHROMATOGRAPH MASS SPECTROMETER

(71) Applicants: SHIMADZU CORPORATION, Kyoto (JP); KYOTO UNIVERSITY, Kyoto (JP)

(72) Inventors: Hiroaki Kozawa, Kyoto (JP); Yuichiro Fujita, Kyoto (JP); Yasushi Ishihama, Kyoto (JP); Kazuyoshi Yoshii, Kyoto (JP)

(73) Assignees: SHIMADZU CORPORATION, Kyoto (JP); KYOTO UNIVERSITY, Kyoto (JP)

( * ) Notice: Subject to any disclaimer, the term of this patent is extended or adjusted under 35 U.S.C. 154(b) by 421 days.

(21) Appl. No.: 17/502,123

(22) Filed: Oct. 15, 2021

(65) Prior Publication Data
US 2022/0236238 A1 Jul. 28, 2022

(30) Foreign Application Priority Data
Jan. 22, 2021 (JP) ................................ 2021-009135

(51) Int. Cl.
*G01N 30/72* (2006.01)
*G01N 30/02* (2006.01)
*G01N 30/86* (2006.01)

(52) U.S. Cl.
CPC ......... *G01N 30/7266* (2013.01); *G01N 30/86* (2013.01); *G01N 2030/027* (2013.01)

(58) Field of Classification Search
None
See application file for complete search history.

(56) References Cited

U.S. PATENT DOCUMENTS

2020/0284739 A1* 9/2020 Murano ............. G01N 23/2209

FOREIGN PATENT DOCUMENTS

JP 2010-019655 A 1/2010

OTHER PUBLICATIONS

Kazuyoshi Yoshii et al., "NMF vs PLCA: Tajuuon Seisei Katei No Tame No Mugen Inshi Moderu To Mugen Kongou Moderu (NMF vs PLCA: Infinite Factor Model and Infinite Mixture Model for Multiple Sound Generation Process", IPSJ SIG Technical Report MUS (Musical Informatics), Aug. 1, 2016, pp. 1-10, vol. 2016-MUS-112, No. 21.

(Continued)

*Primary Examiner* — Raul J Rios Russo
*Assistant Examiner* — Carl F. R. Tchatchouang
(74) *Attorney, Agent, or Firm* — Sughrue Mion, PLLC

(57) ABSTRACT

In order to appropriately set $MS^m$ analysis conditions, an $MS^{m-1}$ analysis executer (51) makes a mass spectrometer (20) perform an $MS^{m-1}$ analysis (where m is an integer from 2 to n) to acquire three-dimensional data showing an intensity for each of the N m/z values and each of the M retention times (where N and M are natural numbers). Based on the three-dimensional data, a data matrix creator (41) creates data matrix X in which intensity data are arranged in N rows which differ from each other in m/z value and M columns which differ from each other in retention-time value. A matrix factorization executer (42) determines an N×K spectrum matrix S and K×M profile matrix P (where K is a natural number) by matrix factorization based on data matrix X so that this matrix X is approximated by product SP of the matrices S and P. An m/z detector (43) detects m/z of a precursor ion originating from a sample component from the values of the matrix elements in each column of matrix S. A retention time detector (44) detects the retention time of a sample component from the values of the matrix elements in (Continued)

each row of matrix P. Based on the m/z and retention time, an $MS^m$ analysis execution condition determiner (45) determines an execution condition of an $MS^m$ analysis including the selection and fragmentation of a precursor ion of a sample component. An $MS^m$ analysis executer (52) makes the mass spectrometer execute an $MS^m$ analysis based on the execution condition.

12 Claims, 9 Drawing Sheets

(56) References Cited

OTHER PUBLICATIONS

Yuji Tsugawa et al., "New technology for comprehensively capturing small molecule metabolites in the body MS-DIALNext generation by programMS / MSanalysis", https://www.jstage.jst.go.jp/article/kagakutoseibutsu/54/3/54_151/_article/-char/ja, Chemistry and Biology, 2016, pp. 151-153, vol. 54, No. 3.

"Quantitative Proteomics", https://www.hemlholts-muenchen.de/proteomics/research/technology/quantitative-proteomics/label-free-dda-dia/index.html, pp. 1-4.

Daniel D. Lee et al., "Algorithms for non-negative matrix factorization", Advances in Neural Information Processing Systems, 2001, vol. 13, No. 1.

Jeremy Rapin et al., "Application of non-negative matrix factorization to LC/MS data", Signal Processing, pp. 75-83, vol. 123, https://doi.org/10.1016/j.sigpro.2015.12.014.

Notice of Allowance dated Jul. 31, 2023 in Chinese Application No. 202111189082.5.

Office Action issued Jan. 30, 2024 in Japanese Application No. 2021-009135.

* cited by examiner

ACTUAL CHROMATOGRAMS (LEFT) AND
ACTUAL CORRESPONDING MASS SPECTRA (RIGHT)

(ACTUAL j=5)

SUPERPOSITION OF LARGE NUMBER OF ACTUAL MASS CHROMATOGRAMS
(WHICH CORRESPONDS TO DATA MATRIX)

<EXAMPLE IN WHICH $\lambda r$ IS TOO SMALL ($\lambda r=1$, j=7, KS STATISTIC=0.0924)>
CHROMATOGRAMS (LEFT) AND MASS SPECTRA (RIGHT)
OBTAINED BY MATRIX FACTORIZATION RETENTION TIME    m/z <EXAMPLE IN WHICH $\lambda r$ IS TOO LARGE ($\lambda r=512$, j=2, KS STATISTIC=0.2652)>
CHROMATOGRAMS (LEFT) AND MASS SPECTRA (RIGHT)
OBTAINED BY MATRIX FACTORIZATION RETENTION TIME    m/z <$\lambda r$ IS OPTIMUM ($\lambda r$=256, j=5 (WHICH AGREES WITH ACTUAL DATA), KS STATISTIC=0.0164 (SMALLEST, HENCE HIGHEST GOODNESS OF FIT)>

CHROMATOGRAMS (LEFT) AND MASS SPECTRA (RIGHT) OBTAINED BY MATRIX FACTORIZATION

Fig. 10

$$X = \begin{pmatrix} X_{11} & X_{12} & X_{13} & * & * & * & * & * & X_{1M} \\ X_{21} & X_{22} & X_{23} & * & * & * & * & * & X_{2M} \\ X_{31} & X_{32} & X_{33} & * & * & * & * & * & X_{3M} \\ * & * & * & * & & & & & * \\ * & * & * & & * & & & & * \\ * & * & * & & & * & & & * \\ * & * & * & & & & * & & * \\ * & * & * & & & & & * & * \\ X_{N1} & X_{N2} & X_{N3} & * & * & * & * & * & X_{NM} \end{pmatrix}$$ N ROWS

M COLUMNS

Fig. 11

$$S = \begin{pmatrix} S_{11} & S_{12} & S_{13} & \cdots & S_{1K} \\ S_{21} & S_{22} & S_{23} & \cdots & S_{2K} \\ S_{31} & S_{32} & S_{33} & \cdots & S_{3K} \\ \vdots & \vdots & \vdots & \ddots & \vdots \\ S_{N1} & S_{N2} & S_{N3} & \cdots & S_{NK} \end{pmatrix}$$ N ROWS

K COLUMNS $$P = \begin{pmatrix} p_{11} & p_{12} & p_{13} & \cdots & p_{1M} \\ p_{21} & p_{22} & p_{23} & \cdots & p_{2M} \\ p_{31} & p_{32} & p_{33} & \cdots & p_{3M} \\ \vdots & \vdots & \vdots & \ddots & \vdots \\ p_{K1} & p_{K2} & p_{K3} & \cdots & p_{KM} \end{pmatrix}$$ K ROWS

M COLUMNS

CHROMATOGRAPH MASS SPECTROMETER

TECHNICAL FIELD

The present invention relates to a chromatograph mass spectrometer (LC/MS or GC/MS) including a liquid chromatograph (LC) or gas chromatograph (GC) combined with a mass spectrometer (MS) having the function of an $MS^n$ analysis in which product ions generated by the fragmentation of a specific kind of ion (precursor ion) is subjected to mass spectrometry.

BACKGROUND ART

For example, a device described in Patent Literature 1 is commonly known as a chromatograph mass spectrometer having the function of an $MS^n$ analysis. In this chromatograph mass spectrometer, when a sufficient amount of sample for performing an analysis two or more times can be prepared, a mass spectrometric analysis for a sample eluted from the LC or GC column is repeatedly performed during the first analysis to acquire a set of data having the three dimensions of m/z (mass-to-charge ratio), retention time and intensity ($MS^1$ analysis, which includes no fragmentation of ions). Based on the acquired three-dimensional data, the intensities within an m/z range specified by an operator are accumulated at each retention time to create a mass spectrum. Each peak is detected from the obtained mass spectrum, and peak information including the m/z corresponding to the peak is obtained. The "m/z corresponding to the peak" is, for example, an m/z value which gives the highest peak intensity in a mass spectrum acquired at an appearance time of a peak (the period of time from the beginning point to the ending point of a peak, or a point in time at which the peak top has appeared). Based on the peak information thus obtained, a precursor ion is specified. The conditions for an $MS^2$ analysis which includes the fragmentation of the specified precursor ion are set, and the second analysis is performed.

The description thus far has been concerned with the case of performing an $MS^2$ analysis in which the precursor ion is fragmented one time under conditions which have been set based on the result of an $MS^1$ analysis which includes no fragmentation of ions. The description similarly applies in the generalized case where an $MS^m$ analysis in which the precursor ion is fragmented m−1 times under conditions which have been set based on the result of an $MS^{m-1}$ analysis in which the precursor ion is fragmented m−2 times (where m is an integer from 2 to n, inclusive, although no fragmentation of ions is performed when m=2).

CITATION LIST

Patent Literature

Patent Literature 1: JP 2010-019655 A

Non Patent Literature

Non Patent Literature 1: Kazuyoshi Yoshii and three other authors, "NMF vs PLCA: Tajuuon Seisei Katei No Tame No Mugen Inshi Moderu To Mugen Kongou Moderu (NMF vs PLCA: Infinite Factor Model and Infinite Mixture Model for Multiple Sound Generation Process)", IPSJ SIG Technical Report MUS (Musical Informatics), Vol. 2016-MUS-112, No. 21, pp. 1-10, Aug. 1, 2016

SUMMARY OF INVENTION

Technical Problem

The method described in Patent Literature 1 requires an operator to manually set the m/z range when determining the precursor ion based on the three-dimensional data acquired by an $MS^{m-1}$ analysis. When the setting is inappropriate, the analysis cannot be performed properly.

The problem to be solved by the present invention is to provide a chromatograph mass spectrometer which can specify a precursor ion based on the three-dimensional data acquired by an $MS^{m-1}$ analysis, and appropriately set $MS^m$ analysis conditions, without requiring an operator to manually set analysis conditions.

Solution to Problem

The chromatograph mass spectrometer according to the present invention developed for solving the previously described problem is a chromatograph mass spectrometer in which a chromatograph configured to temporally separate a sample into components is combined with a mass spectrometer having the function of an $MS^n$ analysis (where n is an integer equal to or greater than 2) in which each component in the sample separated by the chromatograph is subjected to the selection and fragmentation of an ion at least one time, and ions resulting from the fragmentation are subjected to mass spectrometry, the chromatograph mass spectrometer including:

an $MS^{m-1}$ analysis executer configured to make the mass spectrometer perform an $MS^{m-1}$ analysis (where m is an integer from 2 to n, inclusive) to acquire three-dimensional data showing an intensity for each of N m/z values (where N is a natural number) and each of M retention times (where M is a natural number);

a data matrix creator configured to create, based on the three-dimensional data, a data matrix X in which intensity data are arranged in N rows and M columns or M rows and N columns, where the N rows or N columns of intensity data differ from each other in the value of the m/z while the M columns or M rows of data differ from each other in the value of the retention time;

a matrix factorization executer configured to determine a spectrum matrix S and a profile matrix P by a technique of matrix factorization based on the data matrix X so that the data matrix X is approximated by the product SP in which the spectrum matrix S has N rows and K columns (where K is a natural number) while the profile matrix P has K rows and M columns, or by the product PS in which the spectrum matrix S has K rows and N columns while the profile matrix P has M rows and K columns;

an m/z detector configured to detect the m/z of a precursor ion originating from a component contained in the sample, from the values of the matrix elements in each column or each row of the spectrum matrix S;

a retention time detector configured to detect the retention time of a component contained in the sample, from the values of the matrix elements in each row or each column of the profile matrix P;

an $MS^m$ analysis execution condition determiner configured to determine, based on the m/z and the retention time, an execution condition of an $MS^m$ analysis including the selection and fragmentation of a precursor ion of a component contained in the sample; and an $MS^m$ analysis executer configured to make the mass spectrometer execute an $MS^m$ analysis based on the execution condition.

The "data matrix X in which intensity data are arranged in N rows and M columns or M rows and N columns, where the N rows or N columns of intensity data differ from each other in the value of the m/z while the M columns or M rows of data differ from each other in the value of the retention time" created by the data matrix creator means either (i) a data matrix X in which intensity data are arranged in N rows and M columns, where the N rows of intensity data differ from each other in the value of the m/z while the M columns of data differ from each other in the value of the retention time, or (ii) a data matrix X in which intensity data are arranged in M rows and N columns, where the N columns of intensity data differ from each other in the value of the m/z while the M rows of intensity data differ from each other in the value of the retention time. The "product SP in which the spectrum matrix S has N rows and K columns while the profile matrix P has K rows and M columns" used in the matrix factorization executer is applied to the data matrix X in case (i), while the "product PS in which the spectrum matrix S has K rows and N columns while the profile matrix P has M rows and K columns" is applied to the data matrix X in case (ii). The data matrix X in case (i) is the transpose of the data matrix X in case (ii), and vice versa. They essentially hold the same set of data.

K corresponds to the number of kinds of components contained in the sample. This number is called the "factor number" in the technique of matrix factorization. Each column of the spectrum matrix S corresponds to one of the mass spectra of the K kinds of components, while each row of the profile matrix P corresponds to one of the chromatograms of the K kinds of components. In most cases, it is impossible to analytically determine the spectrum matrix S and profile matrix P. To address this problem, a computer-based method is used as follows: A plurality of candidates of the spectrum matrix S and those of the profile matrix P are prepared. For each combination of one candidate of the spectrum matrix S and one candidate of the profile matrix P, an error between one matrix element of the product SP or PS and the corresponding matrix element of the data matrix X is calculated by a predetermined function (called a "loss function") for each matrix element of the product SP or PS. The errors respectively obtained for the matrix elements are totaled. The candidates having the smallest total error are selected as the spectrum matrix S and profile matrix P.

The product SP or PS of the spectrum matrix S and profile matrix P thus determined is not strictly identical to the data matrix X. However, if the matrix factorization is properly performed, the matrix SP or PS will be sufficiently approximate to the data matrix X.

In the chromatograph mass spectrometer according to the present invention, a spectrum matrix S in which each column or row corresponds to the mass spectrum of one of the K kinds of components, and a profile matrix P in which each row or column corresponds to the chromatogram of one of the K kinds of components, are determined from a data matrix X with N rows and M columns or M rows and N columns by the technique of matrix factorization, whereby the information of the mass spectrum and chromatogram for specifying a precursor ion can be obtained without requiring the operator to manually set analysis conditions. Therefore, $MS^m$ analysis conditions can be appropriately set according to the specified precursor ion.

In order to perform a matrix factorization on a data matrix X, it is necessary determine the factor number K. If the number of kinds of components contained in the sample is previously known, that number can be used as the factor number K. However, in normal cases, that number is unknown. When the factor number K is unknown, the matrix factorization executer may be configured to perform the matrix factorization as follows. That is to say, the matrix factorization executer may include:

a regularization parameter-regularization function preparer configured to prepare a plurality of regularization-parameter candidates $\lambda r$ (where r is a natural number from 1 to $r_{max}$) and one regularization function R(S, P) which induces sparsity of the solution;

a matrix candidate determiner configured to solve an optimization problem for each of the plurality of regularization-parameter candidates $\lambda r$ so as to determine a matrix Srt as a spectrum matrix candidate Sr which is a candidate of the spectrum matrix S and a matrix Prt as a profile matrix candidate Pr which is a candidate of the profile matrix P, where the matrices Srt and Prt are determined so as to minimize the value of a loss function $L(S, P)=D(X|SP)+\lambda rR(S, P)$, where D(X|SP) is a distance function expressing the degree of difference between the data matrix X and the product SP, while $\lambda rR(S, P)$ is the product of the regularization-parameter candidate $\lambda r$ and the regularization function R(S, P);

a probability distribution transformer configured to determine, for each of the plurality of regularization-parameter candidates $\lambda r$, a transformed value $y_{nm}=F_{nm}(X_{nm}|(SrPr)_{nm})$ by a variable transform into a common probability distribution Pcommon for each combination of a matrix element $X_{nm}$ of the data matrix X and a corresponding matrix element $(SrPr)_{nm}$ of the product SrPr of the spectrum matrix candidate Sr and the profile matrix candidate Pr, using $F_{nm}$ which is a function for the variable transform from a probability distribution $P_{nm}$ corresponding to the distance function $D(X_{nm}|(SP)_{nm})$ into the common probability distribution Pcommon;

a goodness-of-fit calculator configured to determine, for each of the plurality of regularization-parameter candidates $\lambda r$, a goodness of fit between the transformed value $y_{nm}$ and a cumulative distribution function of the probability distribution Pcommon; and a matrix determiner configured to select, as the spectrum matrix S and the profile matrix P, the spectrum matrix candidate Sr and the profile matrix candidate Pr determined for a regularization-parameter candidate $\lambda r$ which yields the highest value of the goodness of fit among the plurality of regularization-parameter candidates $\lambda r$, or a regularization-parameter candidate $\lambda r$ which yields the goodness of fit higher than a predetermined threshold and also has the largest value of $\lambda r$.

The matrix factorization executer which includes the regularization parameter-regularization function preparer, matrix candidate determiner, probability distribution transformer, goodness-of-fit calculator and matrix determiner is hereinafter called the "matrix factorization executer for an unknown factor number".

By the matrix factorization executer for an unknown factor number, even when the number of kinds of components contained in the sample is unknown, a spectrum matrix candidate Sr in which all elements in one or more columns corresponding to unnecessary factors have a value of zero, and a profile matrix candidate Pr in which all elements in one or more rows corresponding to unnecessary factors have a value of zero, can be prepared due to the effect of the regularization which induces sparsity of the solution. However, if the value of the regularization parameter is too small, the number of columns having non-zero values (i.e., the estimated factor number K) in the matrix S will be too large, causing the problem of "overfitting" (also called the "overtraining", which is a situation in which even a model that is unreasonable and incorrect shows a high level of goodness of fit with data in question if the used model is complex). Conversely, if the value of the regularization parameter is too large, the estimated factor number K will be too small, causing the problem of "underfitting" (or "undertraining") which prevents the model from being satisfactorily fitted to the data.

In the matrix factorization executer for an unknown factor number, one pair of candidates (Sr, Pr) is determined for each of the plurality of regularization-parameter candidates λr by the matrix candidate determiner. The probability distribution transformer, goodness-of-fit calculator and matrix determiner narrow down those candidates using the goodness of fit with an ideal distribution (this will be described later in detail), and ultimately obtain one pair of the spectrum matrix S and profile matrix P (and one factor number K corresponding to them). Thus, both the overfitting and underfitting are prevented. In other words, the setting of a factor number K larger than the actual number of components can be prevented, and the spectrum matrix S and profile matrix P having an appropriate factor number K can be determined.

Commonly known examples of the regularization function for inducing sparsity of the solution include "L1-norm", "linear combination of L1-norm and L2-norm", and "volume constraint". In the regularization function R(S, P) in the present invention, the linear combination of L1-norm and L2-norm is expressed by R(S, P)=α(|S|$_1$+|P|$_1$)+(1−α)(|S|$_2^2$+|P|$_2^2$), where |S|$_1$=Σ$_{i,j}$S$_{i,j}$, |P|$_1$=Σ$_{i,j}$P$_{i,j}$, |S|$_2$=(Σ$_{i,j}$S$_{i,j}^2$)$^{1/2}$, |P|$_2$=(Σ$_{i,j}$P$_{i,j}^2$)$^{1/2}$, and α is a constant between 0 and 1. L1-norm corresponds to the case of α=1. In the "volume constraint", a constraint is placed on the solution so that the total of the values in each column of the matrix P does not exceed 1, and a trace norm (Schatten-1-norm), det|S$^T$S| or log det|S$^T$S+δI| is applied to the matrix S (where I is a unit matrix, and δ is a hyperparameter for controlling the regularization function).

Examples of the distance function D(X|Y) include a Euclidean distance expressed by (X−Y)$^2$, generalized KL (Kullback-Leibler) divergence expressed by X log(X/Y)−(X−Y), IS (Itakura-Saito) divergence expressed by (X/Y)−log(X/Y)−1, and R divergence, which is a generalization of the previously mentioned divergences and expressed as follows:

$$\frac{x^\beta}{\beta(\beta-1)} + \frac{y^\beta}{\beta} - \frac{xy^{\beta-1}}{\beta-1}$$

The total of the values of the function respectively obtained for the matrix elements, D(X|SP)=Σ$_{n,m}$D(X$_{nm}$|(SP)$_{nm}$), represents the degree of difference between the data matrix X and the product SP. It should be noted that (SP)$_{nm}$ represents a matrix element in the matrix given by the product SP.

The cumulative distribution function (this function is hereinafter expressed as f(x) using a generalized variable x) is a function given by the following equation:

$$f(x)=\int_{-\infty}^{x} p(x')dx'$$

where p(x) is a probability density function expressing the probability distribution of the data on which f(x) is based. Examples of the probability density function p(x) include the following functions: (i) Gaussian distribution, (ii) Poisson distribution, (iii) exponential distribution, and (iv) Tweedie distribution. It is commonly known that the cumulative distribution functions f(x) corresponding to the four aforementioned examples of the probability density functions p(x) respectively correspond to (i) Euclidean distance, (ii) generalized KL divergence, (iii) IS divergence and (iv) β divergence mentioned earlier (for example, see Non Patent Literature 1). Any of these loss functions corresponds to a negative log likelihood function for the probability distribution expressed by the corresponding cumulative distribution function f(x). A log likelihood function is a function which expresses the likelihood of the supposed conditions as judged from the observed result. In general, any cumulative distribution function has one corresponding loss function, as with the four aforementioned examples of the correspondence relationship between a cumulative distribution function and a loss function.

The transformed value y$_{nm}$=F$_{nm}$(X$_{nm}$|(SrPr)$_{nm}$) obtained by the probability distribution transformer is determined so that a variable transform is achieved in which the probability distribution Pnm corresponding to each matrix element X$_{nm}$ of the data and each matrix element (SrPr)$_{nm}$ of the product SrPr is transformed into a common probability distribution Pcommon. For example, when the generalized KL divergence is used as the distance function, the corresponding probability distribution Pnm becomes a Poisson distribution. In this case, it is possible to obtain Pcommon in the form of a standard uniform distribution by using a cumulative distribution function as F$_{nm}$, utilizing the fact that any random variable shows a standard uniform distribution after being subjected to a variable transform using a cumulative distribution function (this fact is known as a "probability integral transform"). The more appropriate the matrix factorization is, the higher the goodness of fit is between the empirical distribution function formed by the transformed value y$_{nm}$ after the variable transform into the standard uniform distribution and the cumulative distribution function of the assumed probability distribution Pcommon. Accordingly, in the goodness-of-fit calculator, the goodness of fit between the transformed value y$_{nm}$ and the cumulative distribution function of the probability distribution Pcommon is determined for each of the plurality of regularization-parameter candidates λr. As for the goodness of fit, any known type of goodness of fit can be used, such as a Kolmogorov-Smirnov statistic. As another specific example, when the variance σ$_{nm}^2$ of the noise in each matrix element X$_{nm}$ of the data is previously known, the probability distribution Pcommon can be defined as a standard normal distribution, the cumulative distribution function F$_{nm}$(X$_{nm}$|(SrPr)$_{nm}$) can be defined as (X$_{nm}$−(SrPr)$_{nm}$)/σ$_{nm}$, and −|σ$_y^2$−1| can be used as the goodness of fit, where σ$_y^2$ is given by:

$$\sigma_y^2 = \frac{1}{NM-1}\sum_{n,m} y_{nm}^2$$

which is the unbiased variance of the transformed value y$_{nm}$ whose mean value is assumed to be zero. The goodness of fit in this example indicates whether or not the unbiased variance is close to 1.

After the goodness of fit has been calculated in the previously described manner, the matrix determiner selects, as the spectrum matrix S and profile matrix P, the spectrum matrix candidate Sr and profile matrix candidate Pr determined for (i) a regularization-parameter candidate λr that yields the highest value of the goodness of fit or (ii) a regularization-parameter candidate λr that yields the goodness of fit higher than a predetermined threshold and also has the largest value of the regularization parameter. Condition (ii) is based on the reasoning that a simpler model (having a smaller value of K) is likely to yield a more accurate result, provided that its goodness of fit is at a certainly high level (equal to or higher than a predetermined threshold).

Advantageous Effects of Invention

The chromatograph mass spectrometer according to the present invention can specify a precursor ion based on the three-dimensional data acquired by an $MS^{m-1}$ analysis, and appropriately set $MS^m$ analysis conditions, without requiring an operator to manually set analysis conditions.

When the matrix factorization executer for an unknown factor number is used in the chromatograph mass spectrometer according to the present invention, a spectrum matrix S and profile matrix P whose factor number K is appropriate and close to the number of kinds of components contained in a sample can be determined even when the number of kinds of components is unknown, so that the $MS^m$ analysis conditions can be set more appropriately.

BRIEF DESCRIPTION OF DRAWINGS

FIG. 10 shows an exemplary data matrix.

FIG. 11 shows an exemplary spectrum matrix and profile matrix.

DESCRIPTION OF EMBODIMENTS

One embodiment of the chromatograph mass spectrometer according to the present invention is hereinafter described using FIGS. 1-9.

Figure 1:
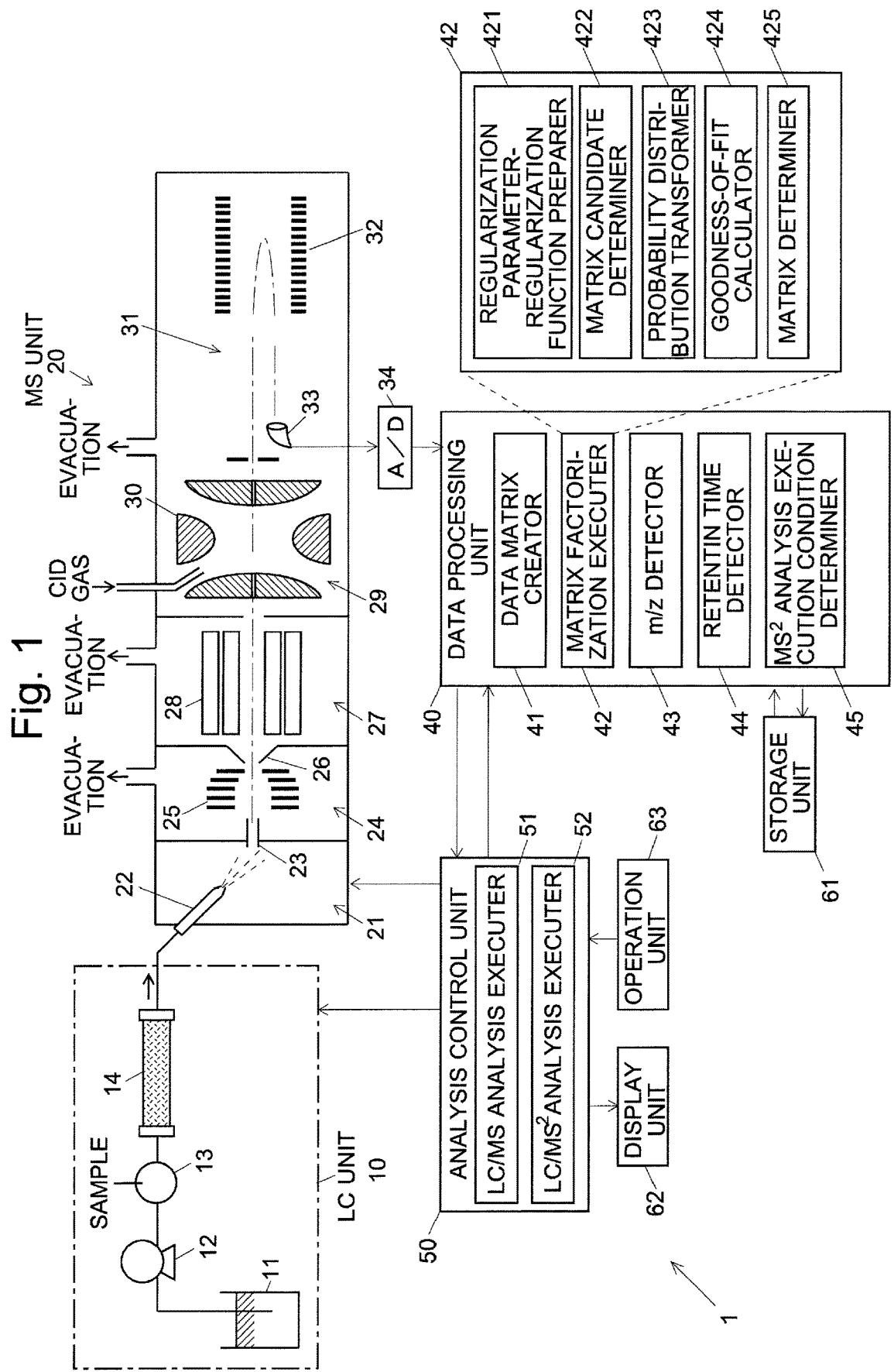
FIG. 1 is a schematic configuration diagram showing one embodiment of the chromatograph mass spectrometer according to the present invention.

(1) Configuration of Chromatograph Mass Spectrometer According to Present Embodiment FIG. 1 shows the configuration of the main components of a liquid chromatograph/ion trap time-of-flight mass spectrometer (LC/IT-TOFMS) 1 which is an embodiment of the present invention. This LC/IT-TOFMS 1 is roughly divided into a liquid chromatograph (LC) unit 10, mass spectrometry (MS) unit 20, data processing unit 40 and analysis control unit 50.

The LC unit 10 includes a mobile phase container 11, liquid supply pump 12, injector 13, and column 14. The mobile phase container 11 is used for storing a mobile phase. The liquid supply pump 12 is configured to draw the mobile phase from the mobile phase container 11 and supply it to the injector 13 at a constant flow rate. The injector 13, which includes an autosampler, is configured to automatically select one of the prepared samples and injects a predetermined volume of the sample into the mobile phase at a predetermined timing. When a sample is injected from the injector 13 into the mobile phase, the sample is carried by the mobile phase and introduced into the column 14. While the sample is passing through the column 14, the various components in the sample are separated from each other and exit from the outlet end of the column 14 in a temporally separated form, to be introduced into the MS unit 20.

The MS unit 20 includes an ionization chamber 21 to be maintained at atmospheric pressure, and an analysis chamber 29 to be maintained at a high degree of vacuum by being evacuated by a turbo molecular pump (not shown). A first-stage intermediate vacuum chamber 24 and second-stage intermediate vacuum chamber 27, with their degrees of vacuum increased in a stepwise manner, are provided between the ionization chamber 21 and analysis chamber 29. The ionization chamber 21 communicates with the first-stage intermediate vacuum chamber 24 through a thin desolvation tube 23. The first-stage intermediate vacuum chamber 24 communicates with the second-stage intermediate vacuum chamber 27 through an orifice of a small diameter bored at the apex of a conical skimmer 26. A first ion guide 25 and second ion guide 28 are arranged within the first-stage intermediate vacuum chamber 24 and second-stage intermediate vacuum chamber 27, respectively.

The ionization chamber 21 is equipped with an ESI nozzle 22 as the ion source. The ESI nozzle 22 is configured to be supplied with an eluate containing sample components from the LC unit 10 and spray the eluate into the ionization chamber 21 in the form of droplets while electrically charging the droplets by a high DC voltage applied from a high voltage source (not shown). The electrically charged droplets collide with gas molecules of atmospheric origin and are thereby broken into even smaller droplets, which are quickly dried (desolvated), leaving sample molecules in a gas state. Those sample molecules are ionized through ion evaporation. The droplets containing the resultant ions are drawn into the desolvation tube 23 by the pressure difference between the ionization chamber 21 and the first-stage intermediate vacuum chamber 24. While passing through the desolvation tube 23, the droplets further undergo desolvation and produce more ions. It should be noted that the method for ionizing sample molecules is not limited to the electrospray ionization (ESI) described in this paragraph; for example, an atmospheric pressure chemical ionization (APCI) or atmospheric pressure photoionization (APPI) can also be used.

The ions which have passed through the desolvation tube 23 travel through the first-stage and second-stage intermediate vacuum chambers 24 and 27 while being converged by the first and second ion guides 25 and 28, and are sent into the analysis chamber 29.

The analysis chamber 29 contains an ion trap 30, time-of-flight mass separator (TOF) 31 as the mass separator, and ion detector 33.

Within the ion trap 30, the ions are temporarily captured and accumulated by a quadrupole electric field created by radio-frequency voltages respectively applied from a power source (not shown) to the electrodes. The various ions accumulated within the ion trap 30 are simultaneously given kinetic energy at a predetermined timing and thereby ejected from the ion trap 30 into the TOF 31.

Additionally, as shown in FIG. 1, the ion trap 30 can be supplied with a collision induced dissociation (CID) gas, such as argon. This allows the ions accumulated within the ion trap 30 to be fragmented into product ions by CID. In the case of an $MS^2$ analysis, after the various ions have been accumulated within the ion trap 30, the voltages applied to the electrodes are controlled so that an ion having a specific m/z among those ions will be selectively retained as a precursor ion. The CID gas is subsequently introduced into the ion trap 30 to promote the fragmentation of the precursor ion. The resultant product ions are simultaneously ejected from the ion trap 30 toward the TOF 31 at a predetermining timing.

The TOF 31 includes a reflectron electrode 32 to which a DC voltage is applied from a DC power source (not shown). Due to the effect of the thereby created DC electric field, the ions are returned and reach the ion detector 33. Among the ions which have been simultaneously ejected from the ion trap 30, an ion having a smaller m/z flies at a higher speed. Consequently, the ions separately reach the ion detector 33, having temporal differences according to their m/z values. The ion detector 33 produces, as a detection signal, an electric current corresponding to the number of ions arriving at the detector.

An analogue-to-digital (A/D) converter 34 for converting the detection signal into a digital value is connected to the ion detector 33. After the conversion by the A/D converter 34, the detection signal is sent to the data processing unit 40.

The data processing unit 40 includes a data matrix creator 41, matrix factorization executer 42, m/z detector 43, retention time detector 44, and $MS^2$ analysis execution condition determiner 45 (which corresponds to the $MS^m$ analysis execution condition determiner with m=2). The matrix factorization executer 42 includes a regularization parameter-regularization function preparer 421, matrix candidate determiner 422, probability distribution transformer 423, goodness-of-fit calculator 424, and matrix determiner 425. Details of those components will be described later. The data processing unit 40 is connected to a storage unit 61.

The analysis control unit 50 is configured to control the components of the LC unit 10 and MS unit 20 so as to perform an LC/MS analysis and $LC/MS^2$ analysis. It includes an LC/MS analysis executer 51 (which corresponds to the $MS^{m-1}$ analysis executer with m=2) and $LC/MS^2$ analysis executer 52 (which corresponds to the $MS^m$ analysis executer with m=2).

The data processing unit 40 and analysis control unit 50 are embodied by a personal computer (PC) on which pre-determined controlling-and-processing software is installed. The storage unit 61 is embodied by a hard disk drive, solid state drive or other types of storage devices provided in or for the PC. The PC also has a display unit 62 as well as an operation unit 63 including a keyboard, mouse, touch panel and/or other devices.

Figure 2:
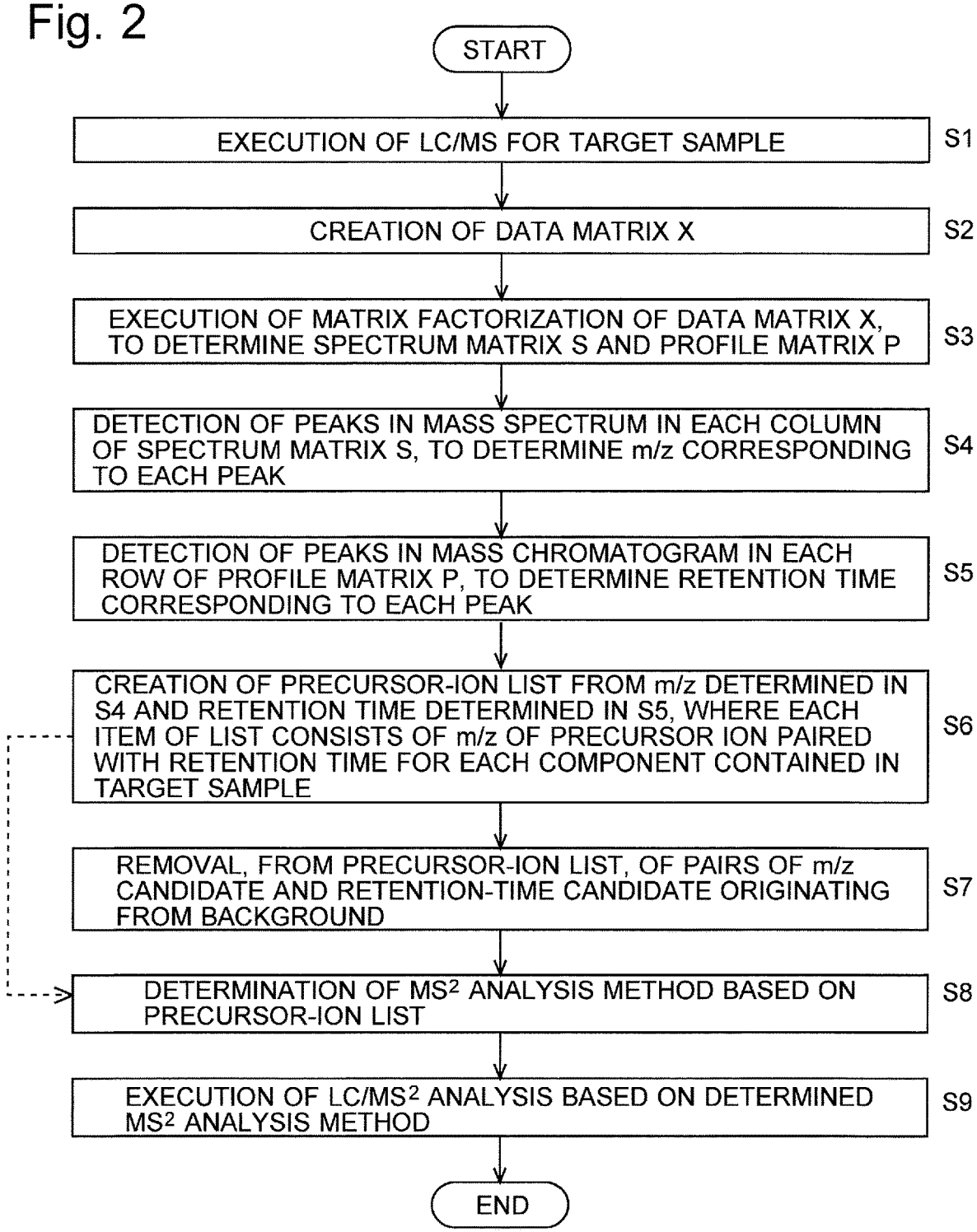
FIG. 2 is a flowchart showing an operation of the chromatograph mass spectrometer according to the present embodiment.
Figure 3:
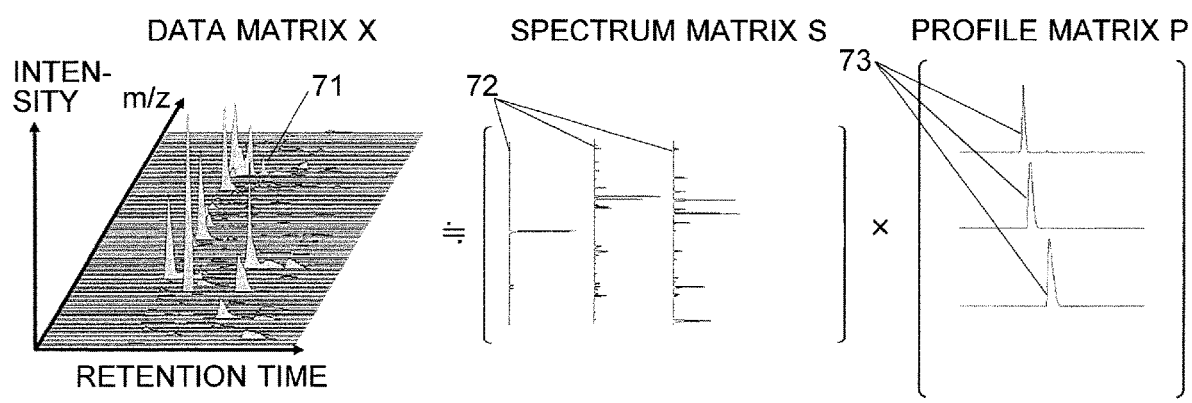
FIG. 3 is a diagram conceptually illustrating a data matrix as well as a spectrum matrix and profile matrix, using one example of the three-dimensional data as well as the data of mass spectra and chromatograms.

(2) Operation of Chromatograph Mass Spectrometer (LC/IT-TOFMS) According to Present Embodiment An operation of the LC/IT-TOFMS 1 according to the present embodiment is hereinafter described using FIGS. 2 and 3. The functions of the components in the data processing unit 40 will also be described.

Initially, an operator using the operation unit 63 performs a predetermined operation to initiate a measurement. In response to this operation, the LC/MS analysis executer 51 in the LC/IT-TOFMS 1 begins to control the components of the LC/IT-TOFMS 1 to conduct an LC/MS analysis for a target sample, as will be described later (Step 1). The target sample injected from the injector 13 into the mobile phase is thereby sent into the column 14, and the eluate from the column 14 is introduced into the MS unit 20, which repeatedly performs a mass spectrometric analysis of the eluate. The detection signals produced by the ion detector 33 in the MS unit 20 are converted into digital values by the A/D converter 34 and sent to the data matrix creator 41 in the data processing unit 40.

In the data matrix creator 41, N signals obtained at each m/z within a predetermined m/z range as a result of one ejection of ions from the ion trap 30 are acquired as the values of N matrix elements to be included in one column of a data matrix X with N rows and M columns. The data acquisition is similarly performed for each of the M ejections of ions performed at intervals of time. Based on those data, the data matrix X with N rows and M columns as shown in FIG. 10 is created (Step 2).

Each matrix element $X_{nm}$ of the data matrix X (where n is an integer from 1 to N, while m is an integer from 1 to M) indicates the intensity detected at the n-th m/z within the aforementioned m/z range as well as at the m-th ion ejection (which corresponds to the retention time). Each matrix element $X_{nm}$ of the data matrix X has a value of zero or positive value (non-negative value).

Next, the matrix factorization executer 42 performs a matrix factorization by a method which will be described later (in "(3) Details of Data Analysis Method (Operation of Matrix Factorization) According to Present Embodiment") to determine a spectrum matrix S with N rows and K columns as well as a profile matrix (also called a "chromatogram matrix") P with K rows and M columns so that their product SP approximates to the data matrix X (Step 3). The spectrum matrix S and profile matrix P can be expressed as shown in FIG. 11.

Each matrix element $s_{nk}$ of the spectrum matrix S (where n is an integer from 1 to N, while k is an integer from 1 to K) indicates the intensity at one m/z value in a mass spectrum originating from one of the K kinds of components contained in a sample (this component is hereinafter called the "k-th component"). Similarly, each matrix element $p_{km}$ of the profile matrix P indicates the intensity at one retention time in the chromatogram originating from the k-th component. In other words, each set of matrix elements surrounded by the broken line in the above spectrum matrix S shows a mass spectrum of one component, while each set of matrix elements surrounded by the broken line in the above profile matrix P shows a chromatogram of one component. Each of the matrix elements $s_{nk}$ of the spectrum matrix S and the matrix elements $p_{km}$ of the profile matrix P has a value of zero or positive value (non-negative value). FIG. 3 conceptually illustrates the data matrix X as well as the spectrum matrix S and profile matrix P, using one example of the three-dimensional data 71 as well as the data of the mass spectra 72 and chromatograms 73.

Next, the m/z detector 43 performs a peak-detecting operation for each column of the obtained spectrum matrix S (i.e., for each value of k from 1 to K), including the steps of detecting one or more peaks from the mass spectrum in the k-th column of the spectrum matrix S and determining the m/z values corresponding to those peaks (Step 4). The m/z values corresponding to those peaks will be the candidates of the m/z value of the precursor ion originating from the k-th component contained in the target sample. Similarly, the retention time detector 44 performs a peak-detecting operation for each row of the obtained profile matrix P (i.e., for each value of k from 1 to K), including the steps of detecting one or more peaks from the chromatogram in the k-th row of the profile matrix P and determining the retention times corresponding to those peaks (Step 5). The retention times corresponding to those peaks will be the candidates of the retention time of the k-th component contained in the target sample.

Based on the candidates of the m/z in the k-th column of the spectrum matrix S obtained in Step 4 and those of the retention time in the k-th row of the profile matrix P obtained in Step 5, the MS² analysis execution condition determiner 45 creates a precursor-ion list L for each value of k from 1 to K (i.e., for each component contained in the target sample), where each item of the list consists of one candidate of the m/z of the precursor ion paired with one candidate of the retention time (Step 6).

In the case where the LC/MS data of a background with no sample has been acquired beforehand, the MS² analysis execution condition determiner 45 may additionally perform, based on the background data, a selecting operation in which all pairs of the m/z candidate and retention-time candidate originating from the background are removed from the precursor-ion list L, and the remaining candidate pairs are selected as new pairs of the m/z candidate and retention-time candidate (Step 7). As another possibility, the previously described operation in Step 7 may be replaced by a selecting operation based on the background data in which only the pairs of the m/z candidate and retention-time candidate that fall within an m/z range and retention-time range which are free from the influence of the background are selected as new pairs of the m/z candidate and the retention-time candidate. These operations in Step 7 may be omitted.

Based on the obtained precursor-ion list L (after the removal of the pairs of the m/z candidate and retention-time candidate originating from the background if Step 7 is carried out), the MS² analysis execution condition determiner 45 determines execution conditions of an MS² analysis (MS² analysis method) including the selection and fragmentation of the precursor ion of a component contained in the sample (Step 8). In most MS² analyses, this type of analysis method is previously known for each component. Therefore, the known analysis methods can be previously stored in the storage unit 61 so that the MS² analysis execution condition determiner 45 can retrieve an appropriate analysis method from the storage unit 61 based on the information concerning the candidates of the m/z and retention time in the precursor-ion list L.

In the process of determining an analysis method, the analysis method for an MS² analysis of one sample may be divided into a plurality of analysis methods so that the loop time (sampling interval) for one MS² analysis will be equal to or less than a predetermined value. This ensures a sufficiently high sampling rate and improves the sensitivity of the quantitative determination.

The process of determining an analysis method may allow the setting of a different level of collision energy for each component to be analyzed. This allows an analysis of each component to be more appropriately performed when an appropriate level of collision energy for each component is previously known. As another possibility, a plurality of levels of collision energy may be set for each component to be analyzed. This allows a tentative analysis to be performed using multiple levels of collision energy to determine an optimum fragmentation condition when an appropriate level of collision energy for each component is unknown.

Based on the analysis method thus determined, the LC/MS² analysis executer 52 in the LC/IT-TOFMS 1 controls each component of the LC/IT-TOFMS 1 to perform an LC/MS² analysis (Step 9). The LC/MS² analysis is performed at all retention times included in the precursor-ion list L. After the LC/MS² analyses at all retention times have been completed, the entire sequence of operations of the LC/IT-TOFMS 1 is discontinued.

(3) Details of Operation of Matrix Factorization

Figure 4:
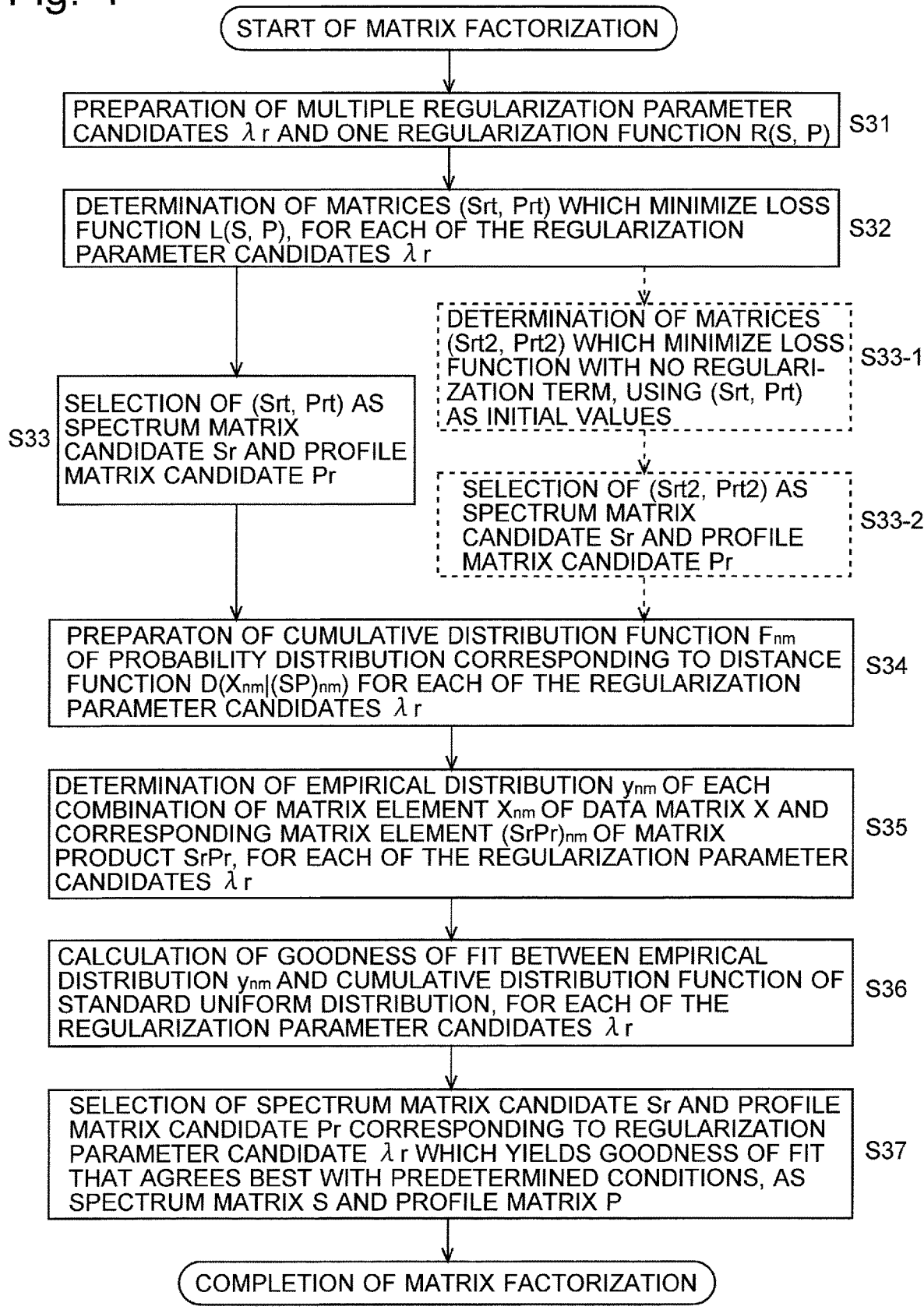
FIG. 4 is a flowchart showing details of the operation for matrix factorization in the operation of the chromatograph mass spectrometer according to the present embodiment.

Next, using FIG. 4, details of the operation of the matrix factorization (Step 3) which is performed in the matrix factorization executer 42 will be described along with the functions of the components in the matrix factorization executer 42.

Initially, the regularization parameter-regularization function preparer 421 prepares a plurality of regularization-parameter candidates λr (in the present case, there are b candidates, where b is a natural number) and one regularization function R(S, P) (Step 31). The regularization function R(S, P) used in the present embodiment is the sum of the L1-norm of the matrix S and that of the matrix P, i.e., $R(S, P)=|S|_1+|P|_1$. The L1-norm of a matrix means the sum of all matrix elements in the matrix. As for the regularization-parameter candidates λr, a plurality of positive real numbers are appropriately selected.

Next, for each of the b regularization-parameter candidates λr, the matrix candidate determiner 422 determines spectrum and profile matrices Srt and Prt which minimize the value of the loss function $L(S, P)=D(X|SP)+\lambda r R(S, P)$ (Step 32). The distance function $D(X|SP)=\Sigma_{n,m}D(X_{nm}|(SP)_{nm})$ is the total of the distances between the matrix elements $X_{nm}$ of the data matrix X and the corresponding matrix elements $(SP)_{nm}$ of the product SP. This function represents the degree of difference between the matrix elements of the data matrix X and those of the product SP. In the present embodiment, the generalized KL divergence $D_{KL}(x|y)=x \log(x/y)-(x-y)$ is used as the distance function D(x|y) for each element.

The matrix candidate determiner 422 further determines a spectrum matrix candidate Sr and profile matrix candidate Pr for each regularization-parameter candidate λr by one of the following two methods. In the first method, the combination of the temporary candidates (Srt, Prt) are directly selected as a spectrum matrix candidate Sr and profile matrix candidate Pr (Step 33).

In the second method, the following operations are performed in place of Step 33. Using Srt and Prt as the initial values, matrices Srt2 and Prt2 which minimize the value of a second loss function having no regularization term, $L_2(S, P)=D(X|SP)$, are determined (Step 33-1). These matrices Srt2 and Prt2 are selected as a spectrum matrix candidate Sr and profile matrix candidate Pr (Step 33-2).

After the combination (Sr, Pr) of the candidates of the spectrum matrix S and profile matrix P has been determined by one of the two methods, the probability distribution transformer 423 prepares a cumulative distribution function $F_{nm}$ of the probability distribution corresponding to the distance function $D(X_{nm}|(SP)_{nm})$ for each of the b regularization-parameter candidates λr (Step 34). Then, for each of the b regularization-parameter candidates λr as well as for each combination $(X_{nm}, (SrPr)_{nm})$ of the matrix element $X_{nm}$ of the data matrix X and the corresponding matrix element $(SrPr)_{nm}$ of the product SrPr of the spectrum matrix candidate Sr and profile matrix candidate Pr, the probability distribution transformer 423 substitutes the values of those matrix elements into the cumulative distribution function FM to determine $y_{nm}=F_{nm}(X_{nm}|(SrPr)_{nm})$ which is expected to show a standard uniform distribution (Step 35). It is commonly known that the cumulative distribution function F(X|SP) corresponding to the generalized KL divergence $D_{KL}(X|SP)=X \log(X/SP)-(X-SP)$, which is the loss function used in the present embodiment, is a cumulative distribution function of a Poisson distribution.

Next, the goodness-of-fit calculator 424 calculates the goodness of fit between the empirical distribution $y_{nm}=F_{nm}(X_{nm}|(SrPr)_{nm})$ determined by the probability distribution transformer 423 for each of the b regularization-parameter candidates λr and the cumulative distribution function of a standard uniform distribution (Step 36). For the calculation of the goodness of fit, commonly known methods for calculating the goodness of fit in statistics are available, such as a Kolmogorov-Smirnov (KS) statistic, Cramer-von Mises statistic, or Anderson-Darling statistic.

Subsequently, the matrix determiner 425 compares the values of the goodness of fit respectively calculated for the regularization-parameter candidates λr, and selects, as the spectrum matrix S and profile matrix P, the spectrum matrix candidate Sr and profile matrix candidate Pr corresponding to the regularization-parameter candidate λr which yields the highest value of the goodness of fit (Step 37). In place of the spectrum and profile matrices corresponding to the regularization-parameter candidate λr which yields the highest value of the goodness of fit, the spectrum matrix candidate Sr and profile matrix candidate Pr corresponding to the largest value of the regularization parameter λr among the regularization-parameter candidates λr which yield the values of the goodness of fit equal to or greater than a predetermined threshold may be selected as the spectrum matrix S and profile matrix P. Thus, the operation of the matrix factorization is completed.

(4) Example of Calculation of Matrix Factorization

Figure 5:
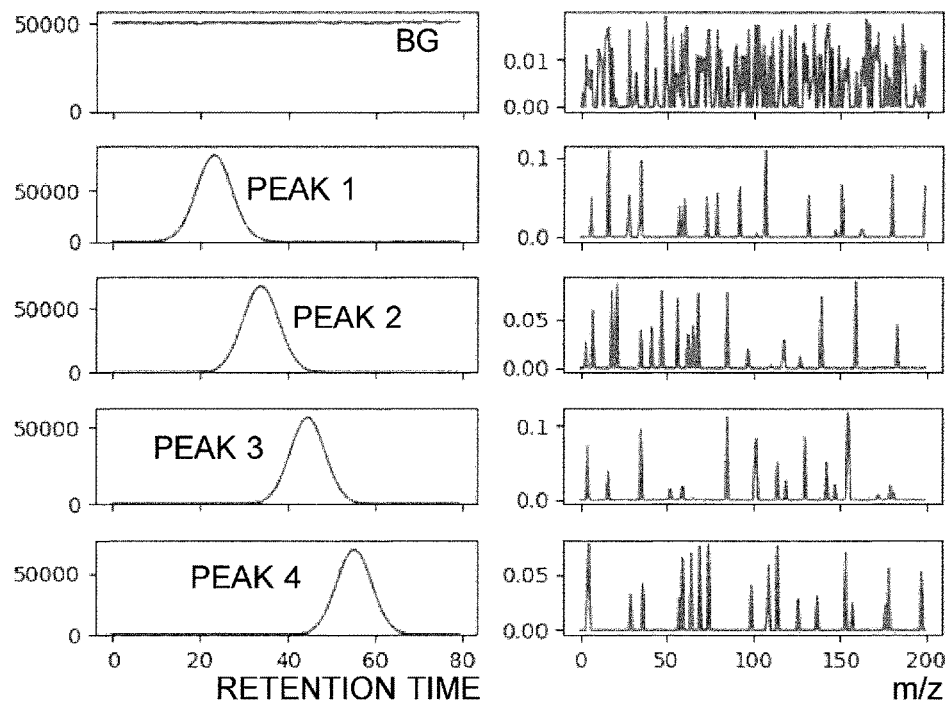
FIG. 5 is a diagram showing measurement data in the form of chromatograms and mass spectra which give the data matrix used in an example of the calculation of the matrix factorization performed in the chromatograph mass spectrometer according to the present embodiment.

An example of the calculation of the matrix factorization using the chromatograms shown in the left section of FIG. 5 and the mass spectra shown in the right section of FIG. 5 is hereinafter described. In the left section of the drawing, a chromatogram acquired by one measurement is divided into five chromatograms showing four peaks originating from four kinds of components and the background (BG). Each of the five chromatograms corresponds to one row of a data matrix. Accordingly, in the present example, the value of j in the actual data (obtained by an experiment) is five. The right section of FIG. 5 shows five mass spectra which correspond to the five chromatograms, respectively.

Figure 6:
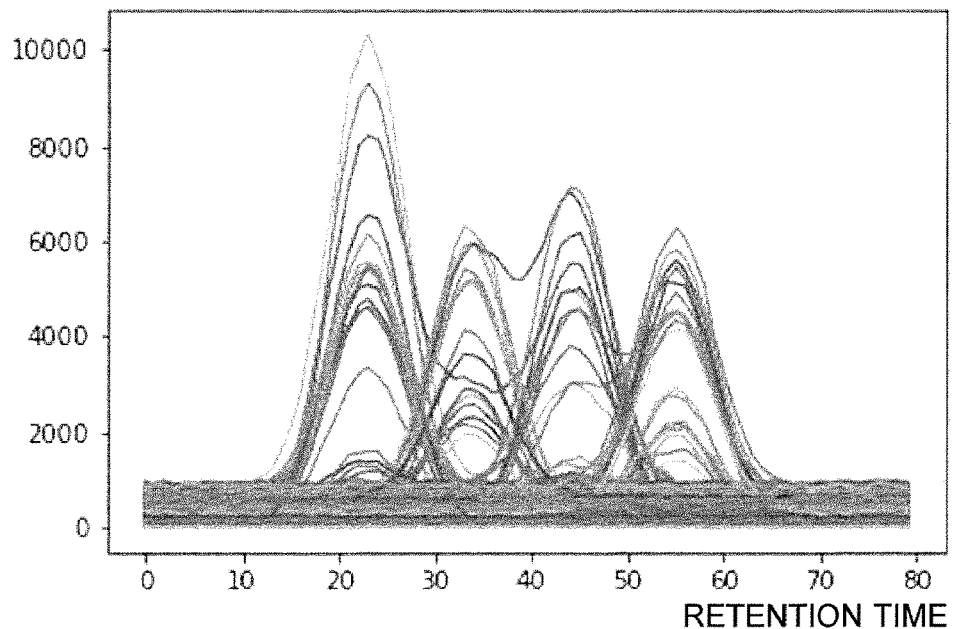
FIG. 6 is a diagram in which measurement data which give a data matrix is shown as a superposition of a plurality of mass chromatograms.

FIG. 6 shows a large number of mass chromatograms acquired at different m/z values from the actual data (obtained by an experiment). This diagram shows the entire information held in the data matrix X. More specifically, one set of intensity values at a number of retention times in one mass chromatogram corresponds to one set of values of the matrix elements in one row of the data matrix X. On the other hand, one set of intensity values on the large number of mass chromatograms at one retention time corresponds to one set of values of the matrix elements in one column of the data matrix X.

For this data matrix X, a spectrum matrix candidate Sr and profile matrix candidate Pr were determined for three values of λr (1, 256 and 512) by the matrix factorization according to the present embodiment, and the goodness of fit was calculated for each case.

Figure 7:
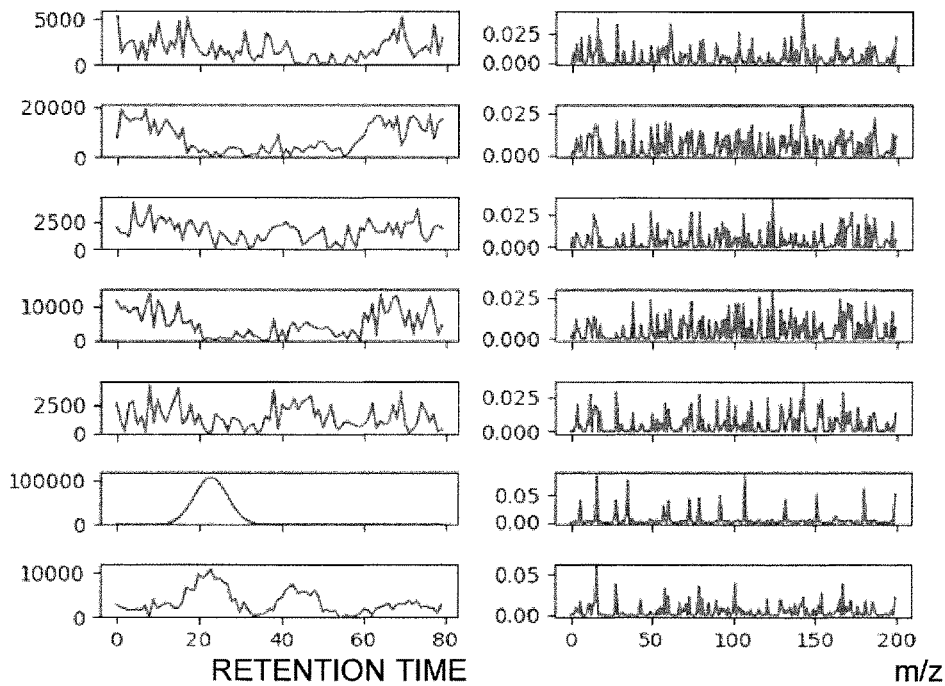
FIG. 7 is a diagram showing an example of the result of a calculation of mass spectra and chromatograms obtained in a matrix factorization in which the regularization is insufficient due to λr being too small.
Figure 8:
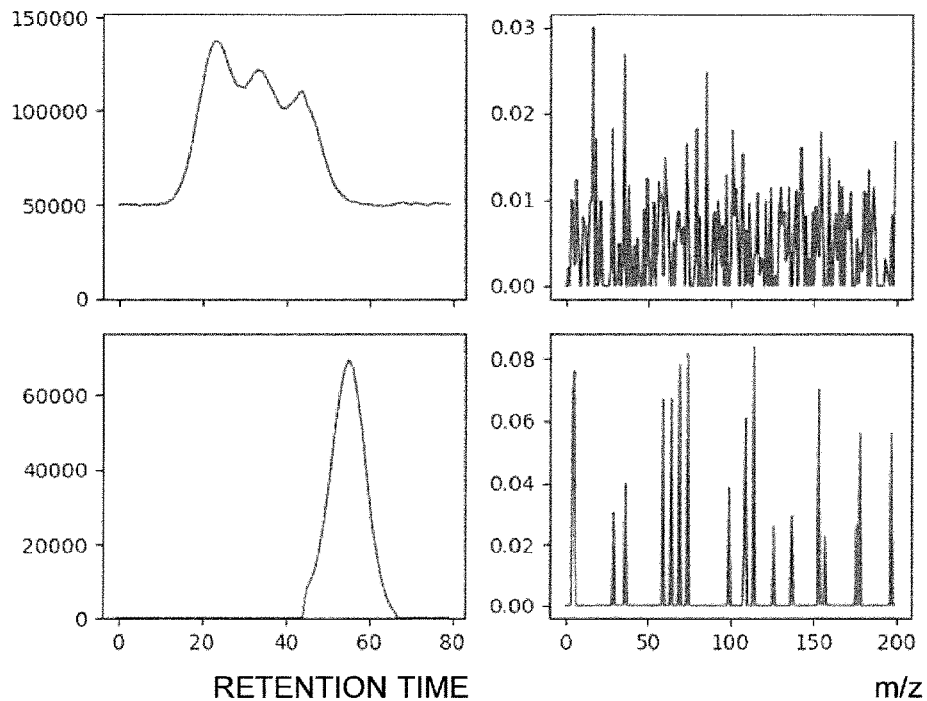
FIG. 8 is a diagram showing an example of the result of a calculation of mass spectra and chromatograms obtained in a matrix factorization in which the regularization is insufficient due to λr being too large.
Figure 9:
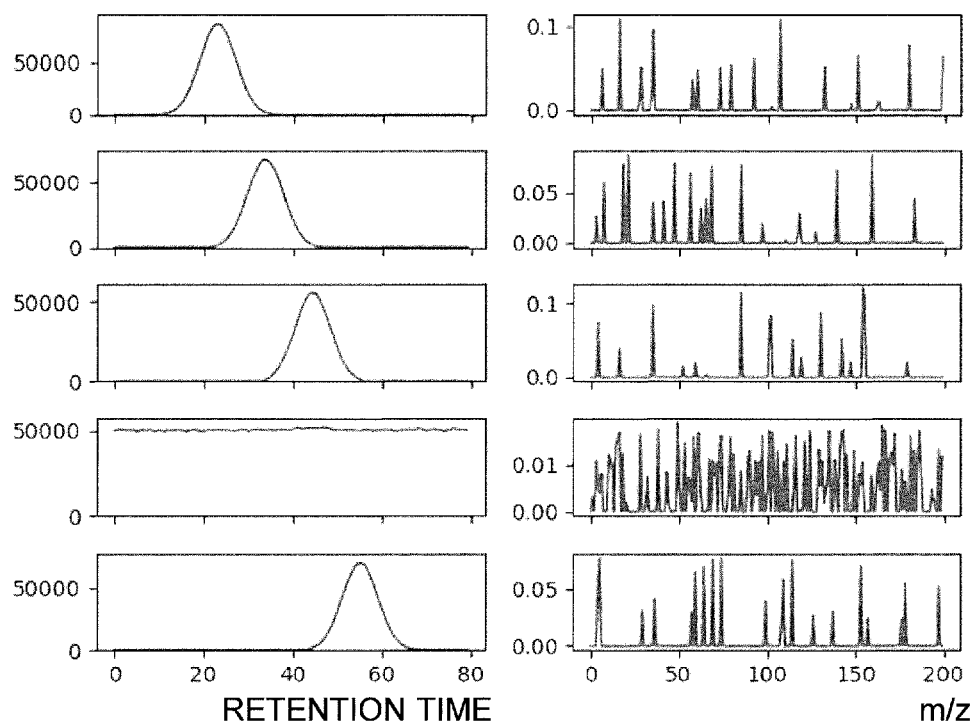
FIG. 9 is a diagram showing an example of the result of a calculation of mass spectra and chromatograms obtained in a matrix factorization in which the regularization is appropriately performed using an optimum value of λr.

FIG. 7 shows the result obtained in the case of λr=1, where the chromatograms (left section) correspond to the rows of the matrix elements of the profile matrix candidate Pr, while the mass spectra (right section) correspond to the columns of the matrix elements of the spectrum matrix candidate Sr. Similarly, FIG. 8 shows chromatograms and mass spectra obtained in the case of λr=512, and FIG. 9 shows chromatograms and mass spectra obtained in the case of λr=256. The calculated value of the KS statistic is also shown in FIGS. 7-9. The KS statistic is a numerical value obtained by the Kolmogorov-Smirnov (KS) test. The smaller the numerical value is, the higher the goodness of fit is.

In the case of λr=1 (FIG. 7), the KS statistic is 0.0924. The value of j in the determined profile matrix candidate Pr and spectrum matrix candidate Sr is 7, which is greater than the actual value (j=5). This means that the regularization was insufficient due to the too small value of λr. As a matter of fact, it is obvious that the obtained chromatograms and mass spectra do not agree with the actual data (FIG. 5).

In the case of λr=512 (FIG. 8), the KS statistic is 0.2652. The value of j in the determined profile matrix candidate Pr and spectrum matrix candidate Sr is 2, which is smaller than the actual value. This means that the regularization had an excessive effect due to the too large value of λr. It is obvious that the obtained chromatograms and mass spectra do not agree with the actual data (FIG. 5).

On the other hand, in the case of λr=256 (FIG. 9), the KS statistic is 0.0164, which is the lowest value among the three candidates. This means the highest goodness of fit among the three candidates. Accordingly, the profile matrix candidate Pr and spectrum matrix candidate Sr in the case of λr=256 should be selected as the profile matrix P and spectrum matrix S from the three candidates. The value of j in the obtained profile matrix candidate Pr and spectrum matrix candidate Sr is 5, which agrees with the actual data. The chromatograms and mass spectra obtained from the profile matrix P and spectrum matrix S are approximate to the actual data (FIG. 5).

In the previously described example, there were three regularization-parameter candidates λr, from each of which a profile matrix candidate Pr and spectrum matrix candidate Sr were obtained and shown in the form of chromatograms and mass spectra. The number of regularization-parameter candidates λr is not limited to three. The larger the number of the regularization-parameter candidates λ is, the more accurate the ultimately obtained profile matrix P and spectrum matrix S will be.

(5) Other Notes

In the previous embodiment, the data matrix X is defined as a matrix with k rows and n columns, the spectrum matrix S is defined as a matrix with k rows and j columns, and the profile matrix P is defined as a matrix with j rows and n columns. It is also possible to define the data matrix X as a matrix with n rows and k columns, the spectrum matrix S as a matrix with j rows and k columns, and the profile matrix P as a matrix with n rows and j columns. In that case, the product PS should be used in place of the product SP.

The configuration of the chromatograph mass spectrometer is not limited to that of the previously described TOFMS 1. For example, the present invention can also be applied in a chromatograph mass spectrometer which includes the combination of a mass filter (e.g., a quadrupole mass filter) and a collision cell in place of the ion trap 30 used in the previous embodiment, as well as an orthogonal acceleration TOF in place of the TOF 31 used in the previous embodiment. Furthermore, the present invention is not limited to TOFMSs but is also applicable in other types of chromatograph mass spectrometers.

In addition, it is needless to say that the present invention is not limited to the previous embodiment but can be changed or modified in various forms.

[Modes of Invention]

A person skilled in the art can understand that the previously described illustrative embodiment is a specific example of the following modes of the present invention.

(Clause 1)

A chromatograph mass spectrometer according to Clause 1 is a chromatograph mass spectrometer in which a chromatograph configured to temporally separate a sample into components is combined with a mass spectrometer having the function of an $MS^n$ analysis (where n is an integer equal to or greater than 2) in which each component in the sample separated by the chromatograph is subjected to the selection and fragmentation of an ion at least one time, and ions resulting from the fragmentation are subjected to mass spectrometry, the chromatograph mass spectrometer including:

an $MS^{m-1}$ analysis executer configured to make the mass spectrometer perform an $MS^{m-1}$ analysis (where m is an integer from 2 to n, inclusive) to acquire three-dimensional data showing an intensity for each of N m/z values (where N is a natural number) and each of M retention times (where M is a natural number);

a data matrix creator configured to create, based on the three-dimensional data, a data matrix X in which intensity data are arranged in N rows and M columns or M rows and N columns, where the N rows or N columns of intensity data differ from each other in the value of the m/z while the M columns or M rows of data differ from each other in the value of the retention time;

a matrix factorization executer configured to determine a spectrum matrix S and a profile matrix P by a technique of matrix factorization based on the data matrix X so that the data matrix X is approximated by the product SP in which the spectrum matrix S has N rows and K columns (where K is a natural number) while the profile matrix P has K rows and M columns, or by the product PS in which the spectrum matrix S has K rows and N columns while the profile matrix P has M rows and K columns;

an m/z detector configured to detect the m/z of a precursor ion originating from a component contained in the sample, from the values of the matrix elements in each column or each row of the spectrum matrix S;

a retention time detector configured to detect the retention time of a component contained in the sample, from the values of the matrix elements in each row or each column of the profile matrix P;

an $MS^m$ analysis execution condition determiner configured to determine, based on the m/z and the retention time, an execution condition of an $MS^m$ analysis including the selection and fragmentation of a precursor ion of a component contained in the sample; and an $MS^m$ analysis executer configured to make the mass spectrometer execute an $MS^m$ analysis based on the execution condition.

The chromatograph mass spectrometer according to Clause 1 can specify a precursor ion based on the three-dimensional data acquired by an $MS^{m-1}$ analysis, and appropriately set $MS^m$ analysis conditions, without requiring an operator to manually set analysis conditions.

(Clause 2)

In the chromatograph mass spectrometer according to Clause 2, which is one mode of the chromatograph mass spectrometer according to Clause 1, the $MS^m$ analysis execution condition determiner is further configured to perform an operation, based on previously acquired data concerning a background, for removing a precursor ion corresponding to a combination of an m/z candidate and a retention-time candidate originating from the background, from the target for which the execution condition for the $MS^m$ analysis should be determined.

(Clause 3)

In the chromatograph mass spectrometer according to Clause 3, which is one mode of the chromatograph mass spectrometer according to Clause 1, the $MS^m$ analysis execution condition determiner is further configured to perform an operation, based on previously acquired data concerning a background, for setting, as a target for which the execution condition for the $MS^m$ analysis should be determined, a precursor ion corresponding to a combination of an m/z candidate and a retention-time candidate that fall within an m/z range and retention-time range which are free from an influence of the background.

The chromatograph mass spectrometer according to Clause 2 or 3 removes an influence of the background based on previously acquired background data. Therefore, the execution condition for the $MS^m$ analysis can be more appropriately determined.

(Clause 4)

In the chromatograph mass spectrometer according to Clause 4, which is one mode of the chromatograph mass spectrometer according to one of Clauses 1-3, the $MS^m$ analysis execution condition determiner is further configured to perform the operation of creating divisional analysis methods by dividing an analysis method for an $MS^m$ analysis of one sample into a plurality of analysis methods so that the loop time for one $MS^m$ analysis will be equal to or less than a predetermined value.

The chromatograph mass spectrometer according to Clause 4 can ensure a sufficiently high sampling rate and improves the sensitivity of the quantitative determination.

(Clause 5)

In the chromatograph mass spectrometer according to Clause 5, which is one mode of the chromatograph mass spectrometer according to one of Clauses 1-4, the $MS^m$ analysis execution condition determiner is further configured to perform the operation of setting a different level of collision energy for each component to be analyzed.

(Clause 6)

In the chromatograph mass spectrometer according to Clause 6, which is one mode of the chromatograph mass spectrometer according to one of Clauses 1-4, the MS$^m$ analysis execution condition determiner is further configured to perform the operation of setting a plurality of levels of collision energy for each component to be analyzed.

The chromatograph mass spectrometer according to Clause 5 can perform an analysis of each component more appropriately when an appropriate level of collision energy for each component is previously known. The chromatograph mass spectrometer according to Clause 6 can perform a tentative analysis using multiple levels of collision energy to determine an optimum fragmentation condition when an appropriate level of collision energy for each component is unknown.

(Clause 7)

In the chromatograph mass spectrometer according to Clause 6, which is one mode of the chromatograph mass spectrometer according to one of Clauses 1-6, the matrix factorization executer includes:

a regularization parameter-regularization function preparer configured to prepare a plurality of regularization-parameter candidates λr (where r is a natural number from 1 to $r_{max}$) and one regularization function R(S, P) which induces sparsity of the solution;

a matrix candidate determiner configured to solve an optimization problem for each of the plurality of regularization-parameter candidates λr so as to determine a matrix Srt as a spectrum matrix candidate Sr which is a candidate of the spectrum matrix S and a matrix Prt as a profile matrix candidate Pr which is a candidate of the profile matrix P, where the matrices Srt and Prt are determined so as to minimize the value of a loss function L(S, P)=D(X|SP)+λrR(S, P), where D(X|SP) is a distance function expressing the degree of difference between the data matrix X and the product SP, while λrR(S, P) is the product of the regularization-parameter candidate λr and the regularization function R(S, P);

a probability distribution transformer configured to determine, for each of the plurality of regularization-parameter candidates λr, a transformed value $y_{nm}$=$F_{nm}$($X_{nm}$|(SrPr)$_{nm}$) by a variable transform into a common probability distribution Pcommon for each combination of a matrix element $X_{nm}$ of the data matrix X and a corresponding matrix element (SrPr)$_{nm}$ of the product SrPr of the spectrum matrix candidate Sr and the profile matrix candidate Pr, using $F_{nm}$ which is a function for the variable transform from a probability distribution $P_{nm}$ corresponding to the distance function D($X_{nm}$|(SP)$_{nm}$) into the common probability distribution Pcommon;

a goodness-of-fit calculator configured to determine, for each of the plurality of regularization-parameter candidates λr, a goodness of fit between the transformed value $y_{nm}$ and a cumulative distribution function of the probability distribution Pcommon; and a matrix determiner configured to select, as the spectrum matrix S and the profile matrix P, the spectrum matrix candidate Sr and the profile matrix candidate Pr determined for a regularization-parameter candidate λr which yields the highest value of the goodness of fit among the plurality of regularization-parameter candidates λr, or a regularization-parameter candidate λr which yields the goodness of fit higher than a predetermined threshold and also has the largest value of λr.

The chromatograph mass spectrometer according to Clause 7 can determine a spectrum matrix S and profile matrix P whose factor number K is appropriate and close to the number of kinds of components contained in a sample even when the number of kinds of components is unknown.

(Clause 8)

In the chromatograph mass spectrometer according to Clause 8, which is one mode of the chromatograph mass spectrometer according to Clause 7, the matrix candidate determiner is configured to use the matrix Srt and the matrix Prt as initial values for determining a matrix Srt2 and a matrix Prt2 which minimize the value of a second loss function with no regularization term, $L_2$(S, P)=D(X|SP), and to select the matrix Srt2 and the matrix Prt2 as the spectrum matrix candidate Sr and the profile matrix candidate Pr, instead of selecting the matrix Srt and the matrix Prt as the spectrum matrix candidate Sr and the profile matrix candidate Pr.

In the chromatograph mass spectrometer according to Clause 8, the matrices Srt and Prt which have been determined so as to minimize the value of the loss function L(S, P)=D(X|SP)+λrR(S, P) are used as initial values for making an additional determination for a second optimization which does not include the regularization term. This operation corrects a bias of the residual due to the regularization and enables the selection of spectrum and profile matrix candidates Sr and Pr which are closer to the actual data. Consequently, the spectrum and profile matrices S and P to be ultimately obtained will be more accurate.

(Clause 9)

In the chromatograph mass spectrometer according to Clause 9, which is one mode of the chromatograph mass spectrometer according to Clause 7 or 8, the regularization term R(S, P) is L1-norm, or a linear combination of L1-norm and L2-norm, or a function which applies a trace norm, det|$S^T S$| or log det|$S^T S+\delta I$| to the matrix S (where I is a unit matrix, and δ is a hyperparameter for controlling the regularization function) while placing a constraint on the solution so that the total of the values in each column of the matrix P should not exceed 1.

(Clause 10)

In the chromatograph mass spectrometer according to Clause 10, which is one mode of the chromatograph mass spectrometer according to one of Clauses 7-9, the cumulative distribution function F(X|Y) is a function selected from a cumulative distribution function calculated from a function expressing a Gaussian distribution, a cumulative distribution function calculated from a function expressing a Poisson distribution, a cumulative distribution function calculated from a function expressing an exponential distribution, and a cumulative distribution function calculated from a function expressing a Tweedie distribution.

(Clause 11)

In the chromatograph mass spectrometer according to Clause 11, which is one mode of the chromatograph mass spectrometer according to one of Clauses 7-10, the goodness-of-fit calculator is configured to calculate the goodness of fit by a test selected from a Kolmogorov-Smirnov test, a Cramer-von Mises test, and an Anderson-Darling test.

(Clause 12)

In the chromatograph mass spectrometer according to Clause 12, which is one mode of the chromatograph mass spectrometer according to one of Clauses 7-10, when the variance $\sigma_{nm}^2$ of the noise in each matrix element $X_{nm}$ is previously known, the goodness-of-fit calculator defines the probability distribution Pcommon as a standard normal distribution, defines the cumulative distribution function $F_{nm}(X_{nm}|(SrPr)_{nm})$ as $(X_{nm}-(SrPr)_{nm})/\delta_{nm}$, and uses $-|\sigma_y^2-1|$ as the goodness of fit, where $\sigma_y^2$ is given by:

$$\sigma_y^2 = \frac{1}{NM-1}\sum_{n,m} y_{nm}^2$$

which is the unbiased variance of the transformed value $y_{nm}$ whose mean value is assumed to be zero.

In the present invention, the various regularization terms R(S, P) mentioned in Clause 9 and the various cumulative functions F(X|Y) mentioned in Clause 10 can be appropriately used. For the calculation of the goodness of fit, the various methods mentioned in Clause 11 or 12, which are commonly known in the area of statistics, can be appropriately used.

REFERENCE SIGNS LIST

1 . . . Liquid Chromatograph/Ion Trap Time-of-Flight Mass Spectrometer
10 . . . Liquid Chromatograph (LC) Unit
11 . . . Mobile Phase Container
12 . . . Liquid Supply Pump
13 . . . Injector
14 . . . Column
20 . . . Mass Spectrometry (MS) Unit
21 . . . Ionization Chamber
22 . . . ESI Nozzle
23 . . . Desolvation Tube
24 . . . First-Stage Intermediate Vacuum Chamber
25 . . . First Ion Guide
26 . . . Skimmer
27 . . . Second-Stage Intermediate Vacuum Chamber
28 . . . Second Ion Guide
29 . . . Analysis Chamber
30 . . . Ion Trap
31 . . . Time-of-Flight (TOF) Mass Separator
32 . . . Reflectron Electrode
33 . . . Ion Detector
34 . . . Analogue-to-Digital (A/D) Converter
40 . . . Data Processing Unit
41 . . . Data Matrix Creator
42 . . . Matrix Factorization Executer
421 . . . Regularization Parameter-Regularization Function Preparer
422 . . . Matrix Candidate Determiner
423 . . . Probability Distribution Transformer
424 . . . Goodness-of-Fit Calculator
425 . . . Matrix Determiner
43 . . . m/z Detector
44 . . . Retention Time Detector
45 . . . $MS^2$ Analysis Execution Condition Determiner
50 . . . Analysis Control Unit
51 . . . LC/MS Analysis Executer
52 . . . $LC/MS^2$ Analysis Executer
61 . . . Storage Unit
63 . . . Operation Unit
71 . . . Three-Dimensional Data
72 . . . Mass Spectrum
73 . . . Chromatogram

The invention claimed is:

1. A chromatograph mass spectrometer in which a chromatograph configured to temporally separate a sample into components is combined with a mass spectrometer having a function of an $MS^n$ analysis (where n is an integer equal to or greater than 2) in which each component in the sample separated by the chromatograph is subjected to selection and fragmentation of an ion at least one time, and ions resulting from the fragmentation are subjected to mass spectrometry, the chromatograph mass spectrometer comprising:

an $MS^{m-1}$ analysis executer configured to make the mass spectrometer perform an $MS^{m-1}$ analysis (where m is an integer from 2 to n, inclusive) to acquire three-dimensional data showing an intensity for each of N m/z values (where N is a natural number) and each of M retention times (where M is a natural number);

a data matrix creator configured to create, based on the three-dimensional data, a data matrix X in which intensity data are arranged in N rows and M columns or M rows and N columns, where the N rows or N columns of intensity data differ from each other in a value of the m/z while the M columns or M rows of data differ from each other in a value of the retention time;

a matrix factorization executer configured to determine a spectrum matrix S and a profile matrix P by a technique of matrix factorization based on the data matrix X so that the data matrix X is approximated by a product SP in which the spectrum matrix S has N rows and K columns (where K is a natural number) while the profile matrix P has K rows and M columns, or by the product PS in which the spectrum matrix S has K rows and N columns while the profile matrix P has M rows and K columns;

an m/z detector configured to detect the m/z of a precursor ion originating from a component contained in the sample, from values of matrix elements in each column or each row of the spectrum matrix S;

a retention time detector configured to detect the retention time of a component contained in the sample, from values of matrix elements in each row or each column of the profile matrix P;

an $MS^m$ analysis execution condition determiner configured to determine, based on the m/z and the retention time, an execution condition of an $MS^m$ analysis including selection and fragmentation of a precursor ion of a component contained in the sample; and an $MS^m$ analysis executer configured to make the mass spectrometer execute an $MS^m$ analysis based on the execution condition.

2. The chromatograph mass spectrometer according to claim 1, wherein the $MS^m$ analysis execution condition determiner is further configured to perform an operation, based on previously acquired data concerning a background, for removing a precursor ion corresponding to a combination of an m/z candidate and a retention-time candidate originating from the background, from a target for which the execution condition for the $MS^m$ analysis should be determined.

3. The chromatograph mass spectrometer according to claim 1, wherein the $MS^m$ analysis execution condition determiner is further configured to perform an operation, based on previously acquired data concerning a background, for setting, as a target for which the execution condition for the $MS^m$ analysis should be determined, a precursor ion corresponding to a combination of an m/z candidate and a retention-time candidate that fall within an m/z range and retention-time range which are free from an influence of the background.

4. The chromatograph mass spectrometer according to claim 1, wherein the $MS^m$ analysis execution condition determiner is further configured to perform an operation of creating divisional analysis methods by dividing an analysis method for an MS$^m$ analysis of one sample into a plurality of analysis methods so that a loop time for one MS$^m$ analysis will be equal to or less than a predetermined value.

5. The chromatograph mass spectrometer according to claim 1, wherein the MS$^m$ analysis execution condition determiner is further configured to perform an operation of setting a different level of collision energy for each component to be analyzed.

6. The chromatograph mass spectrometer according to claim 1, wherein the MS$^m$ analysis execution condition determiner is further configured to perform an operation of setting a plurality of levels of collision energy for each component to be analyzed.

7. The chromatograph mass spectrometer according to claim 1, wherein the matrix factorization executer includes:
   a regularization parameter-regularization function preparer configured to prepare a plurality of regularization-parameter candidates λr (where r is a natural number from 1 to $r_{max}$) and one regularization function R(S, P) which induces sparsity of a solution;
   a matrix candidate determiner configured to solve an optimization problem for each of the plurality of regularization-parameter candidates λr so as to determine a matrix Srt as a spectrum matrix candidate Sr which is a candidate of the spectrum matrix S and a matrix Prt as a profile matrix candidate Pr which is a candidate of the profile matrix P, where the matrices Srt and Prt are determined so as to minimize a value of a loss function L(S, P)=D(X|SP)+λrR(S, P), where D(X|SP) is a distance function expressing a degree of difference between the data matrix X and the product SP, while λrR(S, P) is a product of the regularization-parameter candidate λr and the regularization function R(S, P);
   a probability distribution transformer configured to determine, for each of the plurality of regularization-parameter candidates λr, a transformed value $y_{nm}=F_{nm}(X_{nm}|(SrPr)_{nm})$ by a variable transform into a common probability distribution Pcommon for each combination of a matrix element $X_{nm}$ of the data matrix X and a corresponding matrix element $(SrPr)_{nm}$ of a product SrPr of the spectrum matrix candidate Sr and the profile matrix candidate Pr, using $F_{nm}$ which is a function for the variable transform from a probability distribution $P_{nm}$ corresponding to the distance function $D(X_{nm}|(SP)_{nm})$ into the common probability distribution Pcommon;
   a goodness-of-fit calculator configured to determine, for each of the plurality of regularization-parameter candidates λr, a goodness of fit between the transformed value $y_{nm}$ and a cumulative distribution function of the probability distribution Pcommon; and
   a matrix determiner configured to select, as the spectrum matrix S and the profile matrix P, the spectrum matrix candidate Sr and the profile matrix candidate Pr determined for a regularization-parameter candidate λr which yields a highest value of the goodness of fit among the plurality of regularization-parameter candidates λr, or a regularization-parameter candidate λr which yields the goodness of fit higher than a predetermined threshold and also has a largest value of λr.

8. The chromatograph mass spectrometer according to claim 7, wherein the matrix candidate determiner is configured to use the matrix Srt and the matrix Prt as initial values for determining a matrix Srt2 and a matrix Prt2 which minimize a value of a second loss function with no regularization term, $L_2(S, P)=D(X|SP)$, and to select the matrix Srt2 and the matrix Prt2 as the spectrum matrix candidate Sr and the profile matrix candidate Pr, instead of selecting the matrix Srt and the matrix Prt as the spectrum matrix candidate Sr and the profile matrix candidate Pr.

9. The chromatograph mass spectrometer according to claim 7, wherein the regularization term R(S, P) is L1-norm, or a linear combination of L1-norm and L2-norm, or a function which applies a trace norm, det|S$^T$S| or log det|S$^T$S+δI| to the matrix S (where I is a unit matrix, and δ is a hyperparameter for controlling the regularization function) while placing a constraint on a solution so that a total of values in each column of the matrix P should not exceed 1.

10. The chromatograph mass spectrometer according to claim 7, wherein the cumulative distribution function F(X|Y) is a function selected from a cumulative distribution function calculated from a function expressing a Gaussian distribution, a cumulative distribution function calculated from a function expressing a Poisson distribution, a cumulative distribution function calculated from a function expressing an exponential distribution, and a cumulative distribution function calculated from a function expressing a Tweedie distribution.

11. The chromatograph mass spectrometer according to claim 7, wherein the goodness-of-fit calculator is configured to calculate the goodness of fit by a test selected from a Kolmogorov-Smirnov test, a Cramer-von Mises test, and an Anderson-Darling test.

12. The chromatograph mass spectrometer according to claim 7, wherein, when a variance $\sigma_{nm}^2$ of noise in each matrix element $X_{nm}$ is previously known, the goodness-of-fit calculator defines the probability distribution Pcommon as a standard normal distribution, defines the cumulative distribution function $F_{nm}(X_{nm}|(SrPr)_{nm})$ as $(X_{nm}-(SrPr)_{nm})/\delta_{nm}$, and uses $-|\sigma_y^2-1|$ as the goodness of fit, where $\sigma_y^2$ is given by:

$$\sigma_y^2 = \frac{1}{NM-1}\sum_{n,m} y_{nm}^2$$

which is an unbiased variance of the transformed value $y_{nm}$ whose mean value is assumed to be zero.

* * * * *